United States Patent
Royer et al.

(10) Patent No.: US 9,061,656 B2
(45) Date of Patent: Jun. 23, 2015

(54) PANEL HEATING ELEMENT AND METHOD FOR PRODUCING SAME (75) Inventors: Bastien Royer, Remagen (DE); Li-Ya Yeh, Geilenkirchen (DE); Susanne Lisinski, Cologne (DE); Marcel Klein, Baesweiler (DE); Dang Cuong Phan, Aachen (DE)

(73) Assignee: SAINT-GOBAIN GLASS FRANCE (FR)

( * ) Notice: Subject to any disclaimer, the term of this patent is extended or adjusted under 35 U.S.C. 154(b) by 0 days.

(21) Appl. No.: 14/110,902

(22) PCT Filed: Mar. 27, 2012

(86) PCT No.: PCT/EP2012/055436
§ 371 (c)(1),
(2), (4) Date: Dec. 17, 2013

(87) PCT Pub. No.: WO2012/139883
PCT Pub. Date: Oct. 18, 2012

(65) Prior Publication Data
US 2014/0138370 A1 May 22, 2014

(30) Foreign Application Priority Data

Apr. 12, 2011 (EP) ..................................... 11162131
Apr. 12, 2011 (EP) ..................................... 11162134

(51) Int. Cl.
*B60L 1/02* (2006.01)
*H05B 3/02* (2006.01)
(Continued)

(52) U.S. Cl.
CPC ............ *B60S 1/026* (2013.01); *Y10T 29/49083* (2015.01); *H05B 3/84* (2013.01);
(Continued)

(58) Field of Classification Search
CPC ......... A47C 7/748; B60S 1/026; F24D 13/02; H01C 17/06; H05B 2203/007; H05B 2203/016; H05B 3/16; H05B 3/34; H05B 3/84
USPC ................. 219/203, 212, 213, 214, 217, 522, 219/527–529, 538–549
See application file for complete search history.

(56) References Cited

U.S. PATENT DOCUMENTS 3,427,712 A  2/1969  Witdoeckt
3,749,886 A  7/1973  Michaelsen
(Continued)

FOREIGN PATENT DOCUMENTS

DE  19860870  7/2000
DE  10208552  9/2003
(Continued)

OTHER PUBLICATIONS

Written Opinion for PCT Application PCT/US2013/055439 filed on Mar. 27, 2012. Mail Date: Jul. 9, 2013 (German Original + English Translation).
(Continued)

*Primary Examiner* — Sang Y Paik
(74) *Attorney, Agent, or Firm* — Steinfl & Bruno LLP (57) ABSTRACT

A panel heating element is described. The panel heating element has at least one substrate with a substrate surface, and an electrical heating layer for heating the substrate, which heating layer extends at least over a part of the substrate surface and is connected to at least two electrodes provided for connection to a voltage source such that a current path for a heating current is formed between the electrodes. The heating layer is electrically divided by separating zones each having at least one free zone end. The current path changes its direction of flow at the free zone ends. A transition zone adjoins the zone end of each separating zone.

14 Claims, 3 Drawing Sheets (51) Int. Cl.
*B60S 1/02* (2006.01)
*H05B 3/84* (2006.01)
*H01C 17/06* (2006.01)
*H05B 3/16* (2006.01)
*H05B 3/34* (2006.01)
*A47C 7/74* (2006.01)
*F24D 13/02* (2006.01)
*H01C 17/02* (2006.01)
*H05B 3/26* (2006.01)

(52) U.S. Cl.
CPC ..... *H05B2203/016* (2013.01); *H05B 2203/003* (2013.01); *H05B 2203/007* (2013.01); *H05B 2203/013* (2013.01); *H01C 17/06* (2013.01); *H05B 3/16* (2013.01); *H05B 3/34* (2013.01); *A47C 7/748* (2013.01); *F24D 13/02* (2013.01); *H01C 17/02* (2013.01); *H05B 3/265* (2013.01)

(56) References Cited

U.S. PATENT DOCUMENTS

| | | | |
|---|---|---|---|
| 4,016,645 A | 4/1977 | Cooke | |
| 4,251,316 A | 2/1981 | Smallbone | |
| 4,468,557 A | 8/1984 | Bylin et al. | |
| 5,028,568 A * | 7/1991 | Anderson et al. | 501/12 |
| 5,183,631 A * | 2/1993 | Kugimiya et al. | 419/10 |
| 8,008,607 B2 * | 8/2011 | Ptasienski et al. | 219/543 |
| 2005/0221062 A1 | 10/2005 | Mann | |

FOREIGN PATENT DOCUMENTS

| | | |
|---|---|---|
| DE | 102004029164 | 12/2005 |
| DE | 102007004953 | 7/2008 |
| DE | 102008018147 | 10/2009 |
| DE | 102008029986 | 1/2010 |
| FR | 2592544 | 7/1987 |
| WO | 2006/010698 | 2/2006 |

OTHER PUBLICATIONS

International Preliminary Report on Patentability for PCT Application PCT/US2013/055439 filed on Mar. 27, 2012. Mail Date: Oct. 15, 2013 (German Original + English Translation).

Written Opinion for PCT Application PCT/US2013/055436 filed on Mar. 27, 2012. Mail Date: Jun. 8, 2013 (German Original + English Translation).

International Preliminary Report on Patentability for PCT Application PCT/US2013/055436 filed on Mar. 27, 2012. Mail Date: Oct. 15, 2013 (German Original + English Translation).

PCT International Search Report mailed on Jun. 8, 2012 for PCT Application PCT/EP2012/055436 filed on Mar. 27, 2012 in the name of Saint-Gobain Glass France.

PCT International Search Report mailed on Jul. 9, 2012 for PCT Application PCT/EP2012/055439 filed on Mar. 27, 2012 in the name of Saint-Gobain Glass France.

Notice of Allowance mailed on Jul. 30, 2014 for U.S. Appl. No. 14/110,906, filed Dec. 18, 2013 in the name of Saint-Gobain Glass France.

* cited by examiner

PANEL HEATING ELEMENT AND METHOD FOR PRODUCING SAME

CROSS REFERENCE TO RELATED APPLICATIONS

The present application is the US national stage of International Patent Application PCT/EP2012/055436 filed on Mar. 27, 2012 which, in turn, claims priority to European Patent Applications EP 11162131.4 and EP 11162134.8 filed on Apr. 12, 2011.

Panel heating elements with a substrate and an electrical heating layer are well known per se and have already been described many times in the patent literature. Reference is made merely by way of example in this regard to the German published patent applications DE 102008018147 A1 and DE 102008029986 A1. In motor vehicles, they are often used as windshields since, by law, the central visual field of windshields must have no substantial vision restrictions.

From the industrial series production of panel heating elements, the structuring of the heating layer by means of separating lines to form a usually winding current path is known. This has the advantage that the electrical resistance increases and the current path can be contacted by means of relatively small connection electrodes. In the patent literature, such a panel heating element is, for example, described in the German published application DE 19860870 A1.

With such panel heating elements, the problem occurs that in the region of a curve of the current path, the current distribution becomes inhomogeneous and local heat centers ("hot spots") can develop. These hot spots cause a nonuniform heat distribution in the panel heating element and can result, due to local overheating, in impairment and possibly even damage to the heating layer or the substrate. Moreover, with transparent panes, visual perception through the pane at the overheating points can be impaired.

A solution to this problem is disclosed in the American patent application US 2005/221062 A1. According to it, arc-shaped curved guiding lines are provided at the free ends of the separating lines, by means of which the current path is divided into a plurality of parallel current subpaths.

In contrast, the object of the present invention consists in making available a panel heating element in which the occurrence of local heat centers on curves of the winding current path can be prevented by an alternative solution and an equally uniform heat distribution can be achieved. This and other objects are accomplished according to the proposal of the invention by means of a panel heating element and a method for its production with the characteristics of the coordinated claims. Advantageous embodiments of the invention are indicated by the characteristics of the subclaims.

According to the invention, a panel heating element is presented having at least one flat substrate with a substrate surface and an electrical heating layer made from an electrically conductive material for heating the substrate, which heating layer extends at least over a part of the substrate surface and is connected to at least two electrodes provided for connection to a voltage source such that a current path for a heating current is formed between the electrodes. The heating layer can be applied directly on the substrate. However, it is also conceivable to apply the heating layer on a carrier, for example, a plastic film, in particular a PET film (PET=polyethylene terephthalate), which is then bonded to the substrate, for example, glued. The panel heating element can, in particular, be a composite pane in which two individual panes are bonded to each other by an adhesive layer.

The panel heating element includes one or a plurality of separating zones, which electrically divide the heating layer into sections. The separating zones have, in each case, at least one (free) zone end ending freely inside the heating layer and/or implemented such that, in each case, the current path changes its direction of flow on the free zone ends, for example, by 180°. Preferably, but not mandatorily, the separating zones are implemented as separating lines, linearly, in particular rectilinearly.

A transition zone, which is implemented such that an electrical conductivity of the heating layer decreases toward the free zone end, i.e., decreases to zero, immediately adjoins (in aligned extension) the free zone end of each separating zone. Preferably, but not mandatorily, the transition zone is implemented such that the electrical conductivity of the heating layer decreases continuously, in particular, linearly, toward the free zone end. Preferably, but not mandatorily, the transition zones are implemented linearly, in particular rectilinearly. At the beginning of the transition zone, the electrical conductivity is zero. The end of the transition zone is constituted by the region in which the increasing electrical conductivity has reached the full electrical conductivity of the heating layer.

The panel heating element according to the invention advantageously enables, by means of a spatial variation of the electrical resistance of the heating layer, homogenization of the current flow in the region of a curve of the current path on the free zone ends.

In an advantageous embodiment of the panel heating element according to the invention, the transition zones are implemented such that a layer thickness of the heating layer varies. The layer thickness of the heating layer decreases toward the free zone end or increases away from the free zone end. The beginning of the transition zone is defined by the free zone end on which the layer thickness of the heating layer is zero. The end of the transition zone is defined by reaching the full layer thickness or full electrical conductivity of the heating layer. Preferably, but not mandatorily, the transition zone is implemented such that the layer thickness of the heating layer decreases continuously, in particular linearly, toward the free zone end.

In another advantageous embodiment of the panel heating element according to the invention, the transition zones are implemented such that a porosity of the heating layer increases toward the free zone end, such that, correspondingly, a decrease in the electrical conductivity can be achieved.

In another advantageous embodiment of the panel heating element according to the invention, in which the heating layer has a dopant to increase the electrical conductivity, the transition zones are implemented such that a concentration of the dopant in the transition zone decreases toward the free zone end such that correspondingly a decrease in the electrical conductivity can be achieved.

In another advantageous embodiment of the panel heating element according to the invention, in which the heating layer has a dopant to reduce the electrical conductivity, the transition zones are implemented such that a concentration of the dopant in the transition zone increases toward the free zone end such that correspondingly a decrease in the electrical conductivity can be achieved.

In an advantageous embodiment of the panel heating element, the transition zone has, on one free zone end, a length that corresponds to at least half of the width of the current path on the free zone end measured perpendicular to its length, by means of which a particularly good homogenization of the current flow can be achieved.

In an advantageous embodiment of the panel heating element, a carrier, for example, a plastic film, provided with the electrical heating layer is applied on the substrate surface, with the heating layer implemented in the above-described manner. The plastic film thus serves as a surface-wise carrier for the heating layer. The film can be made of any plastic suitable for the application, for example, polyamide (PA), polyurethane (PU), polyvinyl chloride (PVC), polycarbonate (PC), polyester (PE), polyvinyl butyral (PVB), or polyethylene terephthalate (PET).

The invention further extends to such a carrier, for example, a plastic film, with an electrical heating layer applied at least on a part of a carrier surface and with at least two electrodes provided for connection to a voltage source, which are connected to the heating layer such that a current path for a heating current is formed between the electrodes. The heating layer is implemented in the above-described manner. Accordingly, the heating layer is electrically divided by one or a plurality of separating zones, which have, in each case, at least one free zone end and are implemented such that the current path changes it direction of flow at the free zone ends, with, in each case, a transition zone, in which the electrical conductivity of the heating layer decreases toward the free zone end, adjoining the free end of each separating zone.

Moreover, the invention extends to a method for producing a panel heating element implemented as described above, with the steps:

Provision of at least one flat substrate with a substrate surface and an electrical heating layer for heating the substrate, which heating layer extends at least over a part of the substrate surface and is connected to at least two electrodes provided for connection to a voltage source such that a current path for a heating current is formed between the electrodes;

Electrical division of the heating layer by one or a plurality of separating zones, preferably linear, in particular rectilinear, with separating zones having, in each case, at least one free zone end being implemented such that the current path changes it direction of flow at the free zone ends;

Creation of one or a plurality of transition zones, preferably linear, in particular rectilinear, which transition zones in each case adjoin the free zone end such that an electrical conductivity of the heating layer, resulting in particular from a reduction in the layer thickness of the heating layer, decreases toward the free zone end, in particular continuously, for example, linearly.

As already indicated above, in the method according to the invention, for the purpose of a variation of the electrical conductivity of the heating layer, the transition zones can be designed such that the layer thickness of the heating layer decreases toward the free zone end. It is also conceivable to design the transition zone such that a porosity of the heating layer increases toward the free zone end, a concentration of the dopant improving the electrical conductivity of the heating layer decreases toward the free zone end, and/or a concentration of the dopant ions degrading the electrical conductivity of the heating layer increases toward the free zone end.

In an advantageous embodiment of the method according to the invention, a carrier, preferably a plastic film, provided with the electrical heating layer is applied, with the heating layer implemented in the above-described manner.

The invention further extends to the use of a panel heating element as described above as a functional individual piece and as a built-in part in furniture, devices, and buildings, in particular as a heating element in residential spaces, for example, as wall-mountable or freestanding heating elements, as well as in means of transportation for travel on land, in the air, or on water, in particular in motor vehicles, for example, as a windshield, rear window, side window, and/or glass roof.

It is understood that the various embodiments of the invention can be realized individually or in any combinations. In particular, the aforementioned characteristics and those to be explained in the following can be used not only in the combinations indicated, but also in other combinations or alone, without departing from the scope of the present invention.

BRIEF DESCRIPTION OF THE DRAWINGS

The invention is now explained in detail using an exemplary embodiment with reference to the accompanying figures. They depict, in simplified, not-to-scale representation.

DETAILED DESCRIPTION OF THE DRAWINGS

Figure 3:
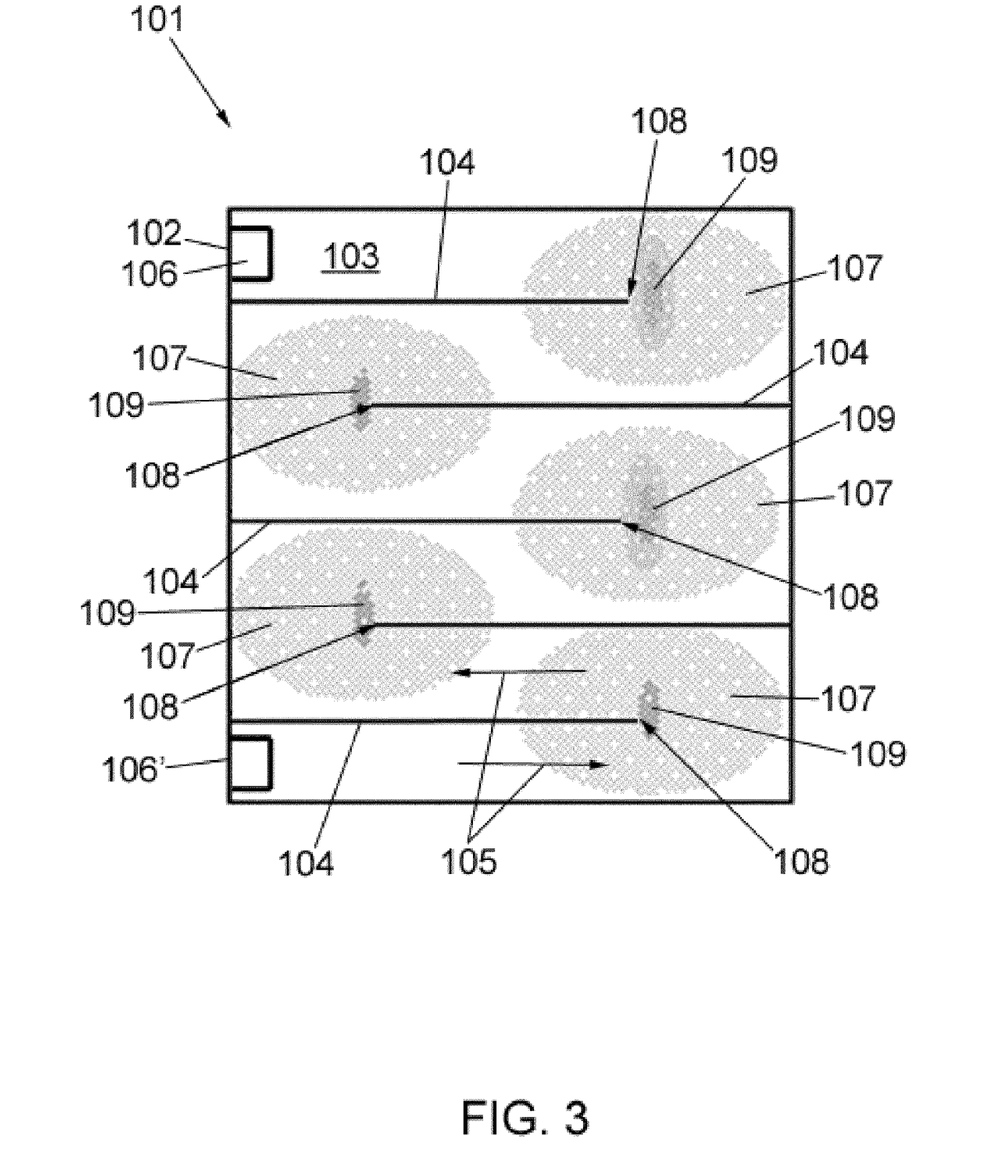
FIG. 3 a conventional panel heating element with representation of local hot spots in a top view.

Reference is first made to FIG. 3, in which a panel heating element according to the prior art, referenced as a whole by the reference number 101, is depicted. The panel heating element 101 comprises a substrate 102, onto which an electrical heating layer 103 is applied. The heating layer 103 is electrically separated by rectilinear separating zones 104 (separating lines) such that a continuous meander-shaped or S-shaped structure is formed by the heating layer 103, which is electrically contacted on both its ends to the two connection electrodes 106, 106' such that a meander-shaped winding current path 105 is formed for a heating current fed to the connection electrodes 106, 106'. The panel heating element 101 is heated by the heating current. The separating zones 104 have, in each case, a free zone end 108 in the heating layer 102.

In change zones 107, in which, in each case, a freely ending zone end 108 of a rectilinear separating zone 104 is contained, the current path 105 or heating current reverses its direction of flow several times by 180°. Accordingly, in the change zones 107, the current path 105 has a curved course, by means of which a nonuniform current density distribution with a concentration of the current flow on the free zone ends 108 results. This typically leads to the occurrence of locally overheated sites or hot spots 109 on the zone ends 108. In addition to a nonuniform heat distribution in the heating element 101, this situation can lead to damage to the heating layer 103 and/or the substrate 102.

The present invention solves this problem in that it homogenizes the distribution of the current flow in the regions of a curve of the current path such that a concentration of the current flow at the reversal sites of the current path is at least to a large extent avoided.

Figure 1:
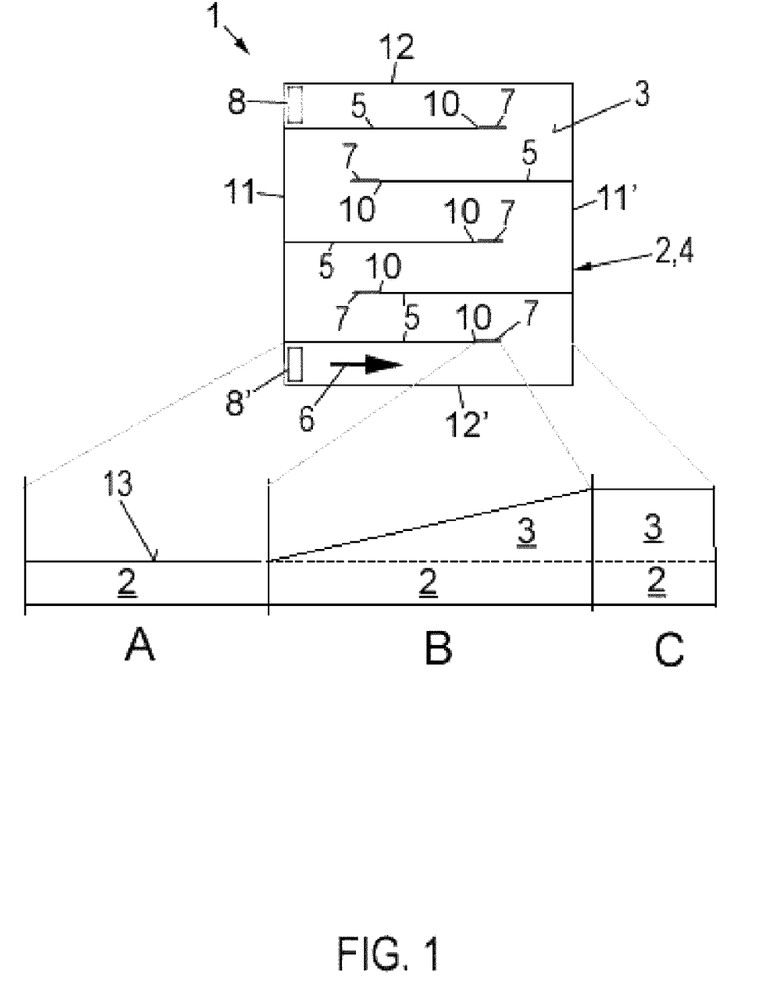
FIG. 1 an embodiment of the panel heating element according to the invention with separating zones and transition zones in a top view and in a cross-sectional view.

This is explained in detail hereinafter. Reference is now made to FIG. 1, in which an embodiment of a panel heating element according to the invention, referred to as a whole by the reference number 1, is depicted. FIG. 1 depicts the panel heating element 1 in an overall representation (top), as well as an enlarged detail thereof (bottom).

According to it, the panel heating element 1 comprises at least a substrate 2, onto which an electrically conductive heating layer 3 is applied substantially over its entire surface. Glass, ceramic, or plastic, for example, can serve as material for the substrate 2. A glass substrate 2 can, for example, be made of float glass, cast glass, or ceramic glass. A plastic substrate 2 can be produced, for example, from polystyrene (PS), polyamide (PA), polyester (PE), polyvinyl chloride (PVC), polycarbonate (PC), polymethyl methacrylate (PMA), or polyethylene terephthalate (PET). In general, any material with sufficient chemical resistance, suitable shape and size stability, as well as, as the case may be, adequate optical transparency can be used for the substrate 2. In the application as a motor vehicle window, for example, a windshield, a substrate 2 transparent to visible light is typically selected, whereas in the application as a heating element to heat an indoor or outdoor area, a ceramic carrier can also be used. Metal conductive carriers are equally suitable as substrate 2, if the heating layer 3 is separated therefrom by an electrical insulation layer. In addition, a metal carrier has the advantage that the heat generated by the heating layer 3 can be readily transmitted due to the high thermal conductivity of metals.

The heating layer 3 includes an electrically conductive material. Examples for this are metals with high electrical conductivity, such as titanium, manganese, indium, chromium, silver, copper, gold, aluminum, or molybdenum, metal alloys such as silver alloyed with palladium, as well as transparent, conductive oxides (TCOs). TCOs are preferably indium tin oxide, fluoride-doped tin dioxide, aluminum-doped tin dioxide, gallium-doped tin dioxide, boron-doped tin dioxide, tin zinc oxide, or antimony-doped tin oxide. The heating layer 3 can consist of one conductive individual layer or for a layer structure that includes at least one conductive sublayer. For example, such a layer structure includes at least one conductive sublayer, preferably silver (Ag), and other sublayers, such as antireflection and blocker layers. The layer thickness of the heating layer 3 can vary widely, with the thickness at every point being, for example, in the range from 0.1 nm to 100 μm. In the case of TCOs, the layer thickness is, for example, in the range from 100 nm to 1.5 μm, preferably in the range from 150 nm to 1 μm, and even more preferably in the range from 200 nm to 500 nm. For example, the layer thickness of a titanium layer is in the range from 0.1 to 2 nm; the layer thickness of a manganese layer, in the range from 0.1 to 1 nm; the layer thickness of a molybdenum layer, in the range from 0.1 to 1 nm; the layer thickness of a silver layer, in the range from 1 to 50 nm; the layer thickness of an indium layer, in the range from 50 to 200 nm; the layer thickness of a gold layer, in the range from 1 to 10 nm; and the layer thickness of a chromium layer is, for example, ca. 1 nm. The sheet resistance of the heating layer 3 is, for example, less than 20 ohm and is, in particular, in the range from 0.1 to 20 ohm. In the exemplary embodiment depicted, the sheet resistance of the heating layer 3 is, for example, in the range from 1 to 5 ohm.

The heating layer 3 is, for example, deposited from the gas phase, for which purpose methods known per se, such as chemical vapor deposition (CVD) or physical vapor deposition (PVD), can be used. Preferably, the heating layer 3 is deposited by sputtering (magnetron cathode sputtering).

Here, the heating layer 3 is, for example, deposited on a carrier 4, which is then bonded, for example, glued, to the substrate 2. Such a carrier 4 can, in particular, be a plastic film, made, for example, of polyethylene terephthalate (PET), polyamide (PA), polyurethane (PU), polyvinyl chloride (PVC), polycarbonate (PC), polyester (PE), or polyvinyl butyral (PVB). It is, however, also conceivable to deposit the heating layer 3 directly onto the substrate 2.

If the panel heating element 1 serves as a heatable vehicle windshield, it must be adequately transparent to visible light in the wavelength range from 350 nm to 800 nm, with the term "transparency" understood to mean a high light transmittance of, for example, more than 80%. This can be obtained, in particular, by means of a glass substrate 2 and a transparent heating layer 3 made of silver (Ag). Generally speaking, the selection of the heating layer 3 is not restricted to one specific material so long as a flat electrical heater can be realized with this material on the substrate 2.

The substrate 2 is, for example, implemented here in the shape of a rectangle, with the substrate 2 having two opposing first substrate edges 11, 11' (here, for example, the longer substrate edges) and two opposing second substrate edges 12, 12' (here, for example, the shorter substrate edges). It is understood that the substrate 2 can have any other shape suitable for the respective application of the panel heating element 1.

The panel heating element 1 can have only a single substrate 2 or, alternatively, a plurality of substrates 2. In the latter case, the panel heating element 1 can, for example, be implemented as a composite pane that has an outer and an inner pane, both implemented as individual substrates and bonded to each other by a thermoplastic adhesive layer. Plastic, in particular based on polyvinyl butyral (PVB), ethylene vinyl acetate (EVA), and polyurethane (PU), can, for example, be used as an adhesive layer for bonding the two individual substrates. The heating layer 3 can, for example, be deposited on the side of the inner pane bonded to the adhesive layer; but it would be equally possible to apply the heating layer 3 not on the inner pane, but, instead, to apply it on the flat carrier 4, which is subsequently glued to the two individual substrates. Since the structure of a composite pane is well known per se to the person skilled in the art, it is superfluous to discuss it in detail here.

As depicted in FIG. 1, the heating layer 3 is electrically separated by a plurality of rectilinear separating zones 5 (separating lines), by which means a continuous meander-shaped or S-shaped current path 6 between two connection electrodes 8, 8' is formed by the heating layer 3. The panel heating element 1 can be heated by feeding a heating current to the connection electrodes 8, 8'. Here, the two connection electrodes 8, 8' are made, for example, of one and the same material and can be produced, in particular in the printing process by printing, for example, a silver printing paste onto the heating layer 3. Alternatively, it would, however, also be possible to produce the two connection electrodes 8, 8' from narrow metal foil strips, in particular, of copper or aluminum, that are fixed on the heating layer 3 and, optionally, on the substrate 1. The connection electrodes 8, 8' can be connected, via connection conductors (not shown), to the two terminals of a voltage source, for example, a battery or accumulator, in particular a vehicle battery, to provide a feed voltage. The voltage source can, for example, make available a feed voltage of 12 to 24 V, corresponding to a typical onboard voltage in combustion driven motor vehicles, or of more than 40 V, corresponding to a typical onboard voltage in electric vehicles. In particular, in the application as panel heating elements 1 for heating in the interior or exterior of a building, the voltage source can also be a central power supply with a mains voltage of, for example, 110 to 220 V.

In the panel heating element 1, the separating zones 5 are produced by removal of the material of the heating layer 3, yielding, for example, V-shaped or U-shaped channels or recesses in the material of the heating layer 3. These channels can also be filled with an electrically insulating material. The removal of the heating layer 3 to form the separating zones 5 can, for example, occur mechanically, for instance, by cutting or grinding. Removal using a laser beam, which removes the material of the heating layer 3 in the separating zones 5, is preferred according to the invention.

In the context of the present invention, the term "separating zone" is generally understood to mean any region of the heating layer 3 that is suitable for separating two adjacent regions of the heating layer from each other electrically such that a current flow via the separating zones 5 is prevented. For this, the separating zones 5 have, for example, an electrical resistance of more than 1 MΩ.

The separating zones 5 have a parallel arrangement and extend alternatingly from the first substrate edge 11 or 11' to the opposing first substrate edge 11' or 11, ending freely in each case with a zone end 10 inside the heating layer 3, without reaching the opposing first substrate edge. This forms the meander-shaped or S-shaped current path 6 in the heating layer 3. Generally speaking, "zone end 10" is understood to mean any region of the separating zone 5 that causes the current path 6 to change its direction of flow inside the heating layer 3 in change zones 9. In other words, the zone ends 10 represent, in each case, reversal points, at which the heating current changes its direction of flow, here, for example, by 180°. In the present case, the zone ends are formed by the free ends of the separating lines for separating zones 5.

In the panel heating elements 1, rectilinear transition zones 7 are arranged, in each case, at the free zone ends 10 in an aligned extension of the rectilinear separating zone 5, with the transition zone 7 immediately following the separating zone 5. However, it is also conceivable for the transition zones 7 to have a different orientation and arrangement relative to the associated separating zone 5.

The transition zones 7 are implemented in each case by reducing the layer thickness of the heating layer 3 in the direction toward the zone end 10. By means of the reduction of the layer thickness of the heating layer 3, the conductivity of the heating layer 3 is locally reduced and, thus, the electrical resistance is increased.

As is discernible from the enlarged cross-sectional view of FIG. 1 (section through the panel element 1 along a separating zone 5 and transition zone 7), the layer thickness of the heating layer 3 increases linearly in the transition zone 7 starting from the zone end 10, until the full layer thickness of the heating layer 3 obtained by deposition is reached in the remaining region of the heating layer 3. Thus, the electrical conductivity in the transition zone 7 changes correspondingly, i.e., decreases toward the zone end 10.

As indicated, there is no heating layer 3 on the substrate 2 in the separating zone 5 (region A). In the transition zone 7 (region B), the layer thickness of the heating layer 3 increases continuously and linearly starting from the free zone end 10 of the separating zone 5, by which means the electrical conductivity of the transition zone 7 increases with the increasing distance from the free zone end 10. In the heating layer 3 (region C), there is an at least approx. constant layer thickness. The beginning of the transition zone 7 is defined by the zone end 10 (transition between region A and region B). The end of the transition zone 7 is defined by reaching the full layer thickness of the heating layer 3 (transition between region B and region C). Since a reduction in the electrical conductivity results in the fact that part of the current is shifted to a region of higher conductivity, a homogenization of the current flow at the zone end 10 can be achieved to prevent hot spots.

A variation of the layer thickness of the heating layer 3 in the transition zones 7 can, for example, occur by means of selective removal of the heating layer 3, preferably using a laser, with a specific amount of material of the heating layer removed depending on the selected energy density of the laser point on the heating layer 3. However, alternatively, other laser parameters could be suitably adapted such as, for instance, power, frequency, pulse length, laser beam shape, or repetition rate. Suitable wavelengths of the laser are, for example, 355 nm, 532 nm, or 1064 nm. Moreover, with the use of a controllable and movable laser head it is possible to obtain a varied removal by adapting the movement of the laser point, for example, by changing the speed or acceleration of the laser point. In order to obtain a desired removal depth of the heating layer 3, the above mentioned methods can be used in any combination. The selection of parameters and of the laser used depends on the material of the heating layer 3 to be structured. In principle, for removal of the heating layer 3 and production of a layer thickness gradient, other methods can even be used, for example, mechanical or chemical methods. A chemical method for removal of the heating layer 3 could, for example, have an etching step.

Advantageously, the transition zone 7 has a length measured in an aligned extension of the separating zone 5 that corresponds to at least twice the width of the current path 6 by means of which it can be accomplished that, in the region of the transition zone 7, a particularly uniform current distribution is present and the creation of hot spots is reliably and safely counteracted or hot spots can be prevented. In the exemplary embodiment depicted, the width of the current path is defined by the perpendicular distance between two rectilinear separating zones 5.

In addition to or instead of a reduction of the layer thickness of the heating layer 3, the transition zone 7 can also be formed by other suitable measures that are capable of changing the electrical conductivity of the heating layer 3 in the region of the free zone end 10 in the desired manner, for example, by changing the porosity of the heating layer 3 or adding impurities or dopants to the heating layer 3. In particular, the transition zone 7 can be implemented such that the porosity of the heating layer 3 increases toward the free zone end 10, resulting in the fact that the electrical conductivity of the heating layer 3 decreases. For the case in which the heating layer 3 has a dopant to increase the electrical conductivity, the transition zone 7 can be implemented such that a concentration of the dopant in the transition zone decreases toward the free zone end such that the electrical conductivity of the heating layer 3 decreases. For the case in which the heating layer 3 has a dopant to reduce the electrical conductivity, the transition zone 7 can be implemented such that a concentration of the dopant in the transition zone increases toward the free zone end such that the electrical conductivity of the heating layer 3 decreases.

Figure 2A:
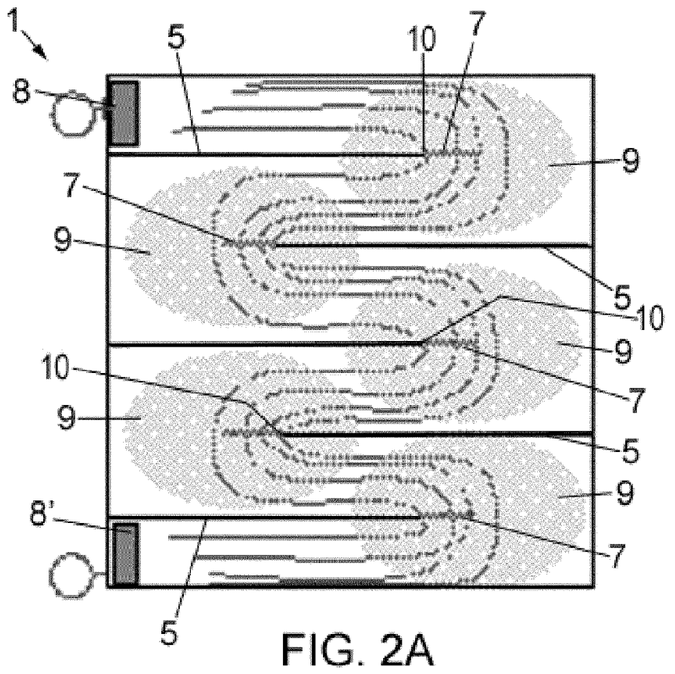
FIG. 2A-2B the panel heating element of FIG. 1 with a sketched-in current path in a top view (FIG. 2A), as well as a conventional panel heating element without transition zones (FIG. 2B)
Figure 2B:
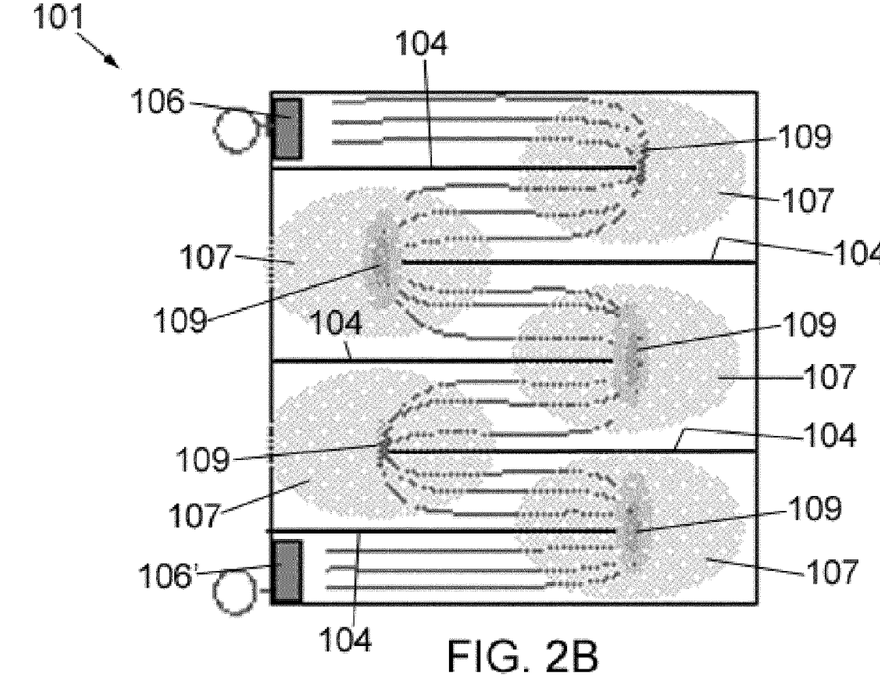

FIG. 2A depicts the panel heating element 1 of FIG. 1, with the current path 6 represented by current lines. According to it, concentration of the current flow at the free zone ends 10 in the region of a curve of the current path 6 is prevented by a change of the electrical conductivity in the transition zones 7, by means of which the occurrence of hot spots can be counteracted. Compared to this, FIG. 2B illustrates a corresponding situation in the conventional panel element 101 of FIG. 3. According to it, the current flow concentrates in the region of the free zone ends 10, by means of which the temperature in this region increases greatly, resulting in an undesired, nonuniform heat distribution in the panel heating element 101 and the occurrence of hot spots 109.

LIST OF REFERENCE CHARACTERS

1 panel heating element
2 substrate
3 heating layer
4 carrier
5 separating zone
6 current path
7 transition zone
8, 8' connection electrode
9 change zone
10 zone end
11, 11' first substrate edge
12, 12' second substrate edge
13 substrate surface
101 panel heating element
102 substrate
103 heating layer
104 separating zone
105 current path
106, 106' connection electrode
107 change zone
108 zone end
109 hot spot

The invention claimed is:

1. A panel heating element, comprising:
at least one substrate with a substrate surface,
an electrical heating layer made from an electrically conductive material for heating the substrate, wherein the electrical heating layer extends at least over a part of the substrate surface and is connected to at least two electrodes provided for connection to a voltage source such that a current path for a heating current is formed between the electrodes,
one or more separating zones, which electrically divide the electrical heating layer, wherein the one or more separating zones are linearly implemented as one or more separating lines, the one or more separating lines having a total surface area smaller than a total surface area of the electrical heating layer, wherein the one or more separating zones have in each case at least one free zone end and are implemented such that the current path changes its direction of flow on the zone ends, and wherein, in each case, a transition zone, which is linearly implemented such that an electrical conductivity of the electrical heating layer decreases toward the free zone end, adjoins the zone end of each separating zone, wherein an electrical conductivity at the beginning of the transition zone is zero and an electrical conductivity at the end of the transition zone has a value equal to a maximum value of the electrical conductivity of the heating layer.

2. The panel heating element according to claim 1, wherein the transition zone has a length that corresponds to at least half of a width of the current path measured perpendicular to its length.

3. The panel heating element according to claim 1, wherein in the transition zone, a layer thickness of the electrical heating layer decreases toward the at least one free zone end.

4. The panel heating element according to claim 1, wherein in the transition zone, a porosity of the electrical heating layer increases toward the at least one free zone end.

5. The panel heating element according to claim 1, wherein the electrical heating layer has a dopant to increase the electrical conductivity, with a concentration of the dopant in the transition zone decreasing toward the at least one free zone end.

6. The panel heating element according to claim 1, wherein the electrical heating layer has a dopant to reduce the electrical conductivity, with a concentration of the dopant in the transition zone increasing toward the at least one free zone end.

7. The panel heating element according to claim 1, wherein on the substrate surface, a carrier, provided with the electrical heating layer, is applied.

8. The panel heating element of claim 1, wherein the transition zone has a linearly increasing thickness in a longitudinal direction.

9. A carrier, for example, a plastic film, with an electrical heating layer made of an electrically conductive material applied at least on a part of a carrier surface and with at least two electrodes provided for connection to a voltage source, which are connected to the electrical heating layer such that a current path for a heating current is formed between the electrodes, with the electrical heating layer electrically divided by one or more separating zones, wherein the one or more separating zones are linearly implemented as one or more separating lines, the one or more separating lines having a total surface area smaller than a total surface area of the electrical heating layer, each of which has at least one free zone end and which are implemented such that the current path changes its direction of flow around the free zone ends, with, in each case, a transition zone, which is linearly implemented such that an electrical conductivity of the electrical heating layer decreases toward the free zone end, adjoining the free zone end of each separating zone, wherein an electrical conductivity at the beginning of the transition zone is zero and an electrical conductivity at the end of the transition zone has a value equal to a maximum value of the electrical conductivity of the heating layer.

10. The carrier of claim 9, wherein the transition zone has a linearly increasing thickness in a longitudinal direction.

11. A method for producing a panel heating element, comprising:
providing at least one flat substrate with a substrate surface and an electrical heating layer made of an electrically conductive material for heating the substrate, wherein the electrical heating layer extends at least over a part of the substrate surface and is connected to at least two electrodes provided for connection to a voltage source such that a current path for a heating current is formed between the at least two electrodes;
electrically dividing the electrical heating layer by one or more separating lines, the one or more separating lines having, in each case, at least one free zone end and being implemented such that the current path changes its direction of flow around the at least one free zone ends, the one or more separating lines having a total surface area smaller than a total surface area of the electrical heating layer; and
creating one or more linear transition zones, each transition zone adjoining the free zone end of a separating line and the electrical conductivity of the electrical heating layer decreasing toward the at least one free zone end, wherein an electrical conductivity at the beginning of the transition zone is zero and an electrical conductivity at the end of the transition zone has a value equal to a maximum value of the electrical conductivity of the heating layer.

12. The method according to claim 11, wherein a carrier provided with the electrical heating layer, in particular a plastic film, is applied on the substrate surface.

13. The method of claim 11, wherein the creating one or more linear transition zones comprises linearly increasing a thickness of the one or more linear transition zones in a longitudinal direction.

14. A method comprising:
  using the panel heating element according to claim 1 as a functional individual piece and as a built-in part in furniture, devices, and buildings, and in particular as a heating element in residential spaces, for example, as wall-mountable or freestanding heating elements, as well as in means of transportation for travel on land, in the air, or on water, in particular in motor vehicles, for example, as a windshield, rear window, side window, and/or glass roof.

* * * * *